US008675087B2

(12) United States Patent
Oshima

(10) Patent No.: US 8,675,087 B2
(45) Date of Patent: Mar. 18, 2014

(54) IMAGE PICKUP APPARATUS AND CONTROL METHOD FOR CORRECTING DATA OUTPUT FROM PIXELS OF AN IMAGE PICKUP ELEMENT

(75) Inventor: Koji Oshima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 650 days.

(21) Appl. No.: 12/143,083

(22) Filed: Jun. 20, 2008

(65) Prior Publication Data

US 2008/0316336 A1 Dec. 25, 2008

(30) Foreign Application Priority Data

Jun. 21, 2007 (JP) .................................. 2007-163996

(51) Int. Cl.
*H04N 5/228* (2006.01)

(52) U.S. Cl.
USPC .................. 348/222.1; 348/207.99; 348/241; 348/246; 382/162; 382/165; 382/167; 382/254; 382/262

(58) Field of Classification Search
USPC .......... 348/222.1, 207.99, 241, 246; 382/162, 382/167, 165, 254, 260, 262
See application file for complete search history.

(56) References Cited

U.S. PATENT DOCUMENTS

| 5,604,825 | A * | 2/1997 | Hirota et al. | 382/261 |
|---|---|---|---|---|
| 6,724,945 | B1 * | 4/2004 | Yen et al. | 382/274 |
| 7,061,533 | B1 * | 6/2006 | Urushiya | 348/346 |
| 7,576,787 | B2 * | 8/2009 | Kinoshita | 348/247 |
| 7,804,533 | B2 * | 9/2010 | Oshima | 348/246 |
| 2003/0039402 | A1 * | 2/2003 | Robins et al. | 382/275 |
| 2003/0226984 | A1 * | 12/2003 | Iwakiri | 250/580 |
| 2005/0058362 | A1 * | 3/2005 | Kita | 382/254 |
| 2006/0050158 | A1 * | 3/2006 | Irie | 348/246 |
| 2007/0040920 | A1 * | 2/2007 | Kinoshita | 348/246 |
| 2007/0146508 | A1 * | 6/2007 | Oshima | 348/243 |
| 2007/0172128 | A1 * | 7/2007 | Hirao | 382/202 |
| 2009/0079853 | A1 * | 3/2009 | Hoshuyama et al. | 348/246 |

FOREIGN PATENT DOCUMENTS

| JP | 6-30425 A | 2/1994 |
|---|---|---|
| JP | 2002-125154 A | 4/2002 |
| JP | 2004-015191 A | 1/2004 |
| JP | 2005-223796 A | 8/2005 |

OTHER PUBLICATIONS

Japanese Office Action dated Mar. 6, 2012 for JP 2007-163996.

* cited by examiner

*Primary Examiner* — Antoinette Spinks
(74) *Attorney, Agent, or Firm* — Carter, DeLuca, Farrell & Schmidt LLP

(57) ABSTRACT

An image pickup apparatus that performs accurate correction processing for a pixel that outputs a non-reproducible high-level signal having a continuity with respect to an adjacent pixel is provided. The image pickup apparatus extracts data corresponding to a pixel of an image pickup element that generates an output value equal to or more than a predetermined value, and determines, within a predetermined area of a captured image, whether a predetermined number or more of pixels that generate an output value having the predetermined level are continuously adjacent to one another in the same direction, irrespective of the color received by the pixel. Then, if it is determined that the predetermined number or more of pixels are continuously adjacent to one another in the same direction, the pixels are indicated as targets and the outputs of the target pixels are corrected.

14 Claims, 5 Drawing Sheets

|   | x | x+1 | x+2 | x+3 | x+4 | x+5 | x+6 | x+7 | x+8 | x+9 | x+10 |
|---|---|---|---|---|---|---|---|---|---|---|---|
| y | R | G | R | G | R | G | R | G | R | G | R |
| y+1 | G | B | G | B | G | B | G | B | G | B | G |
| y+2 | R | G | R | G | R | G | R | G | R | G | R |
| y+3 | G | B | G | B | G | B | G | B | G | B | G |
| y+4 | R | G | R | G | R | G | R | G | R | G | R |
| y+5 | G | B | G | B | G | B | G | B | G | B | G |
| y+6 | R | G | R | G | R | G | R | G | R | G | R |
| y+7 | G | B | G | B | G | B | G | B | G | B | G |
| y+8 | R | G | R | G | R | G | R | G | R | G | R |
| y+9 | G | B | G | B | G | B | G | B | G | B | G |
| y+10 | R | G | R | G | R | G | R | G | R | G | R |

IMAGE PICKUP APPARATUS AND CONTROL METHOD FOR CORRECTING DATA OUTPUT FROM PIXELS OF AN IMAGE PICKUP ELEMENT

BACKGROUND OF THE INVENTION

1. Field of the Invention

The present invention relates to an image pickup apparatus including an image pickup element, such as a charge-coupled device (CCD) image sensor or a complementary metal-oxide semiconductor (CMOS) image sensor, and to a control method for the image pickup apparatus. More particularly, the present invention relates to processing for correcting data output from pixels of the image pickup element.

2. Description of the Related Art

Defective pixels may be generated in image pickup elements provided in image pickup apparatuses, such as digital cameras or video cameras, in the process of manufacture or the like. The levels of outputs from defective pixels are different from the levels of outputs from normal pixels, and such differences cause deteriorations in image quality.

A technique for performing correction of a defective pixel of an image pickup element, data of the defective pixel having been stored in advance, and performing, if necessary, processing for inspecting the image pickup element, extracting data corresponding to a defective pixel that generates an output at a level different from those of other pixels, storing data of the extracted defective pixel, and performing correction for the defective pixel is disclosed, for example, in Japanese Patent Laid-Open No. 2002-125154.

In addition, a technique for performing real-time correction for a defective pixel by extracting data corresponding to a defective pixel on the basis of a difference between the signal level of a specific pixel having a specific color and the signal level of an adjacent pixel having the specific color in a captured image and on the basis of a difference in the signal level of a peripheral pixel having a different color and the signal level of another peripheral pixel having the different color is disclosed, for example, in Japanese Patent Laid-Open No. 06-30425.

In rare instances, apart from a signal of a defective pixel, due to the influence of cosmic rays, extraneous noise, or the like, a non-reproducible signal being an output at a level higher than those of other pixels, having a continuity with respect to an adjacent pixel, irrespective of the color of the pixel, and appearing as sudden noise may be generated.

With the configuration described in Japanese Patent Laid-Open No. 2002-125154, even in a case where it is desired to perform correction for a pixel outputting such a non-reproducible signal, correction can be performed only for a defective pixel whose data has been stored in advance.

In addition, with the configuration described in Japanese Patent Laid-Open No. 6-30425, in the case that a defective pixel is identified simply on the basis of a difference in signal level between pixels having the same color, data corresponding to a pixel to be subjected to correction may not be properly extracted.

In addition, since extraction of data corresponding to and correction of a defective pixel are performed in accordance with a specific threshold determination based on a difference in signal level between pixels having the same color, a high-frequency component, such as an object edge, may be falsely detected.

SUMMARY OF THE INVENTION

Thus, there is room for improvement in performance of accurate correction processing for a pixel that outputs a non-reproducible high-level signal having a continuity with respect to an adjacent pixel, irrespective of the color of the pixel.

The present invention is directed to an image pickup apparatus.

According to an aspect of the present invention, an image pickup apparatus includes an image pickup element configured to include a plurality of pixels each configured to convert an image of an object into an electric signal; an extraction unit configured to extract, from the image pickup element, data corresponding to pixels that generate signals having a predetermined level; a determination unit configured to determine whether a condition that a predetermined number or more of the pixels that generate signals having the predetermined level are continuously adjacent to one another in a same direction is satisfied; a storage unit configured to store, in a case that the determination unit determines that the condition is satisfied, data corresponding to the continuously adjacent pixels that indicates the continuously adjacent pixels are targets to be corrected; and a correction unit configured to correct signals output from the target pixels.

According to another aspect of the present invention, a method for correcting outputs of an image pickup element including a plurality of pixels each configured to convert an image of an object into an electric signal includes extracting, from the image pickup element, data corresponding to pixels that generate signals having a predetermined level; determining whether a condition that a predetermined number or more of the pixels that generate signals having the predetermined level are continuously adjacent to one another in a same direction is satisfied; storing, in a case that it is determined in the determining that the condition is satisfied, data corresponding to the continuously adjacent pixels that indicates the continuously adjacent pixels are targets to be corrected; and correcting signals output from the target pixels.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

An embodiment of the present invention will be described with reference to the drawings.

Figure 1:
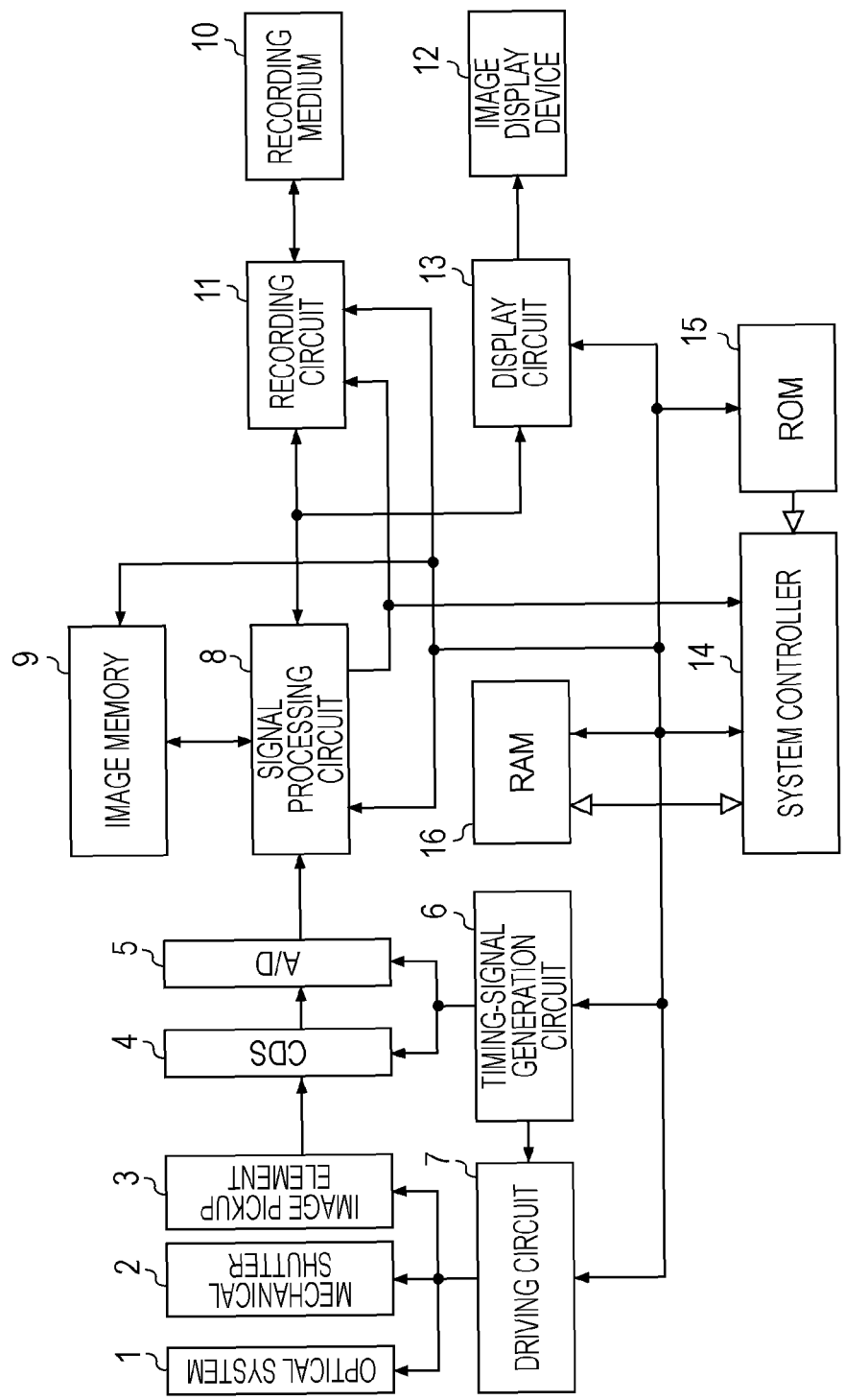
FIG. 1 is a block diagram showing an image pickup apparatus according to an embodiment of the present invention.
Figures 2, 3:
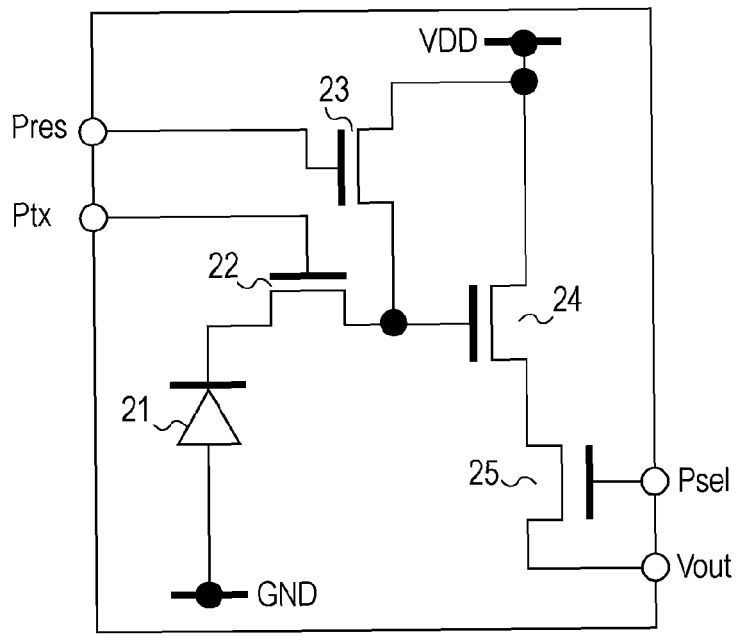
FIG. 2 shows an example of the pixel arrangement of an image pickup element.
FIG. 3 is a block diagram showing a pixel of a CMOS area sensor.

FIG. 1 is a block diagram illustrating an image pickup apparatus according to an embodiment of the present invention. FIG. 2 shows an example of the pixel arrangement of an image pickup element.

Referring to FIG. 1, the image pickup apparatus according to this embodiment includes an optical system 1 including a lens and an aperture, a mechanical shutter 2, and an image pickup element 3. In this embodiment, a CMOS area sensor of a Bayer pattern is used as the image pickup element 3.

The image pickup element 3 includes a plurality of pixels arranged two-dimensionally in an x-y matrix, as shown in FIG. 2. Symbols R, G, and B represent the positions of R (red), G (green), and B (blue) color filters formed on the image pickup element 3. A color filter is provided for each pixel. A signal of an R-component of an object is output from a pixel that receives light passing through an R-color filter. A signal of a G-component of an object is output from a pixel that receives light passing through a G-color filter. A signal of a B-component of an object is output from a pixel that receives light passing through a B-color filter.

A correlated double sampling (CDS) circuit 4 performs analog-signal processing, and an analog-to-digital (A/D) converter 5 converts an analog signal into a digital signal. A timing-signal generation circuit 6 generates signals (operation pulses) for operating the image pickup element 3, the CDS circuit 4, and the A/D converter 5. A driving circuit 7 drives the optical system 1, the mechanical shutter 2, and the image pickup element 3. The timing-signal generation circuit 6 generates an operation pulse under the control of a system controller 14.

A signal processing circuit 8 performs signal processing necessary for captured image data. The signal processing circuit 8 performs substitution processing for correction of a defective pixel, processing for extracting data corresponding to a pixel that outputs a noise signal at a high level having a continuity with respect to an adjacent pixel, and correction processing.

An image memory 9 is an area in which signal-processed image data is stored. A recording medium 10 is a memory card or the like that can be removed from and inserted into the image pickup apparatus. A recording circuit 11 records signal-processed image data in the recording medium 10. An image display device 12 displays signal-processed image data through a display circuit 13.

The system controller 14 includes a central processing unit (CPU) that controls the entire image pickup apparatus. A read-only memory (ROM) 15 stores a program in which a control method to be performed by the system controller 14 is written, control data including a parameter and a table to be used when the program is performed, and correction data including an address of a defective pixel. In this embodiment, correction data that has been checked and transmitted from a manufacturing plant of the image pickup element (CMOS area sensor) 3 and that is supported by each sensor is stored as correction data of a defective pixel. However, correction data is not necessarily such data. For example, after the image pickup element 3 is built in the image pickup apparatus, information on a defective pixel may be generated and the generated information may be stored in the ROM 15.

A program, control data, and correction data stored in the ROM 15 are transferred to and stored in the RAM 16 and are used when the system controller 14 controls the image pickup apparatus.

Figure 4:
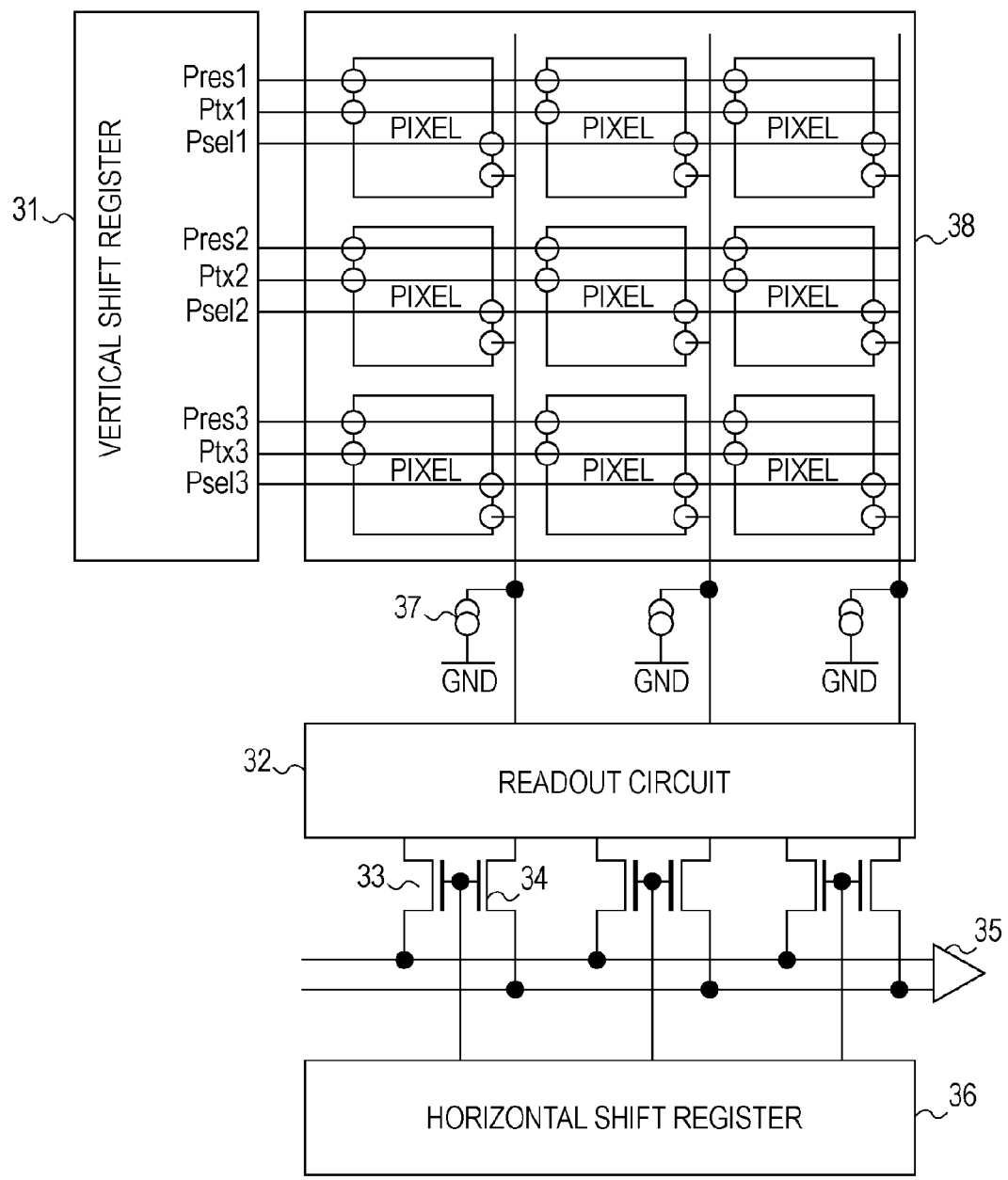
FIG. 4 is a block diagram showing the CMOS area sensor.

FIG. 4 is a block diagram showing an example of the configuration of the image pickup element 3, which is a CMOS area sensor. A vertical shift register 31 outputs signals of row selection lines Pres1, Ptx1, Psel1, and the like to pixels in the first row in the pixel area 38. A pixel in the pixel area 38 corresponds to a pixel shown in FIG. 2. Pixels in the pixel area 38 output signals generated by photoelectric conversion to vertical signal lines. Constant-current sources 37 are connected to the vertical signal lines. A readout circuit 32 receives pixel signals on the vertical signal lines and outputs the pixel signals to a differential amplifier 35 through n-channel metal-oxide semiconductor (MOS) field-effect transistors 33 and a horizontal signal line. In addition, the readout circuit 32 outputs noise signals to the differential amplifier 35 through n-channel MOS field-effect transistors 34. A horizontal shift register 36 turns on and turns off the transistors 33 and 34. The differential amplifier 35 outputs a difference between a pixel signal and a noise signal.

FIG. 3 is a block diagram showing an example of the configuration of a pixel in the pixel area 38 shown in FIG. 4. In this example, the anode of a photodiode 21, which generates an optical signal charge, is grounded. The cathode of the photodiode 21 is connected to the gate of an amplifying MOS field-effect transistor 24 through a transfer MOS field-effect transistor 22. The source of a reset MOS field-effect transistor 23 for resetting the amplifying MOS field-effect transistor 24 is connected to the gate of the amplifying MOS field-effect transistor 24. The drain of the reset MOS field-effect transistor 23 is connected to a power supply voltage VDD. The drain of the amplifying MOS field-effect transistor 24 is connected to the power supply voltage VDD, and the source of the amplifying MOS field-effect transistor 24 is connected to the drain of a selection MOS field-effect transistor 25.

The gate of the transfer MOS field-effect transistor 22 of a pixel located in the first row is connected to a first row selection line (vertical scanning line) Ptx1 shown in FIG. 4 extending in a horizontal direction. The gates of the transfer MOS field-effect transistors 22 of the other pixels located in the same row are also connected to the first row selection line Ptx1. The gate of the reset MOS field-effect transistor 23 is connected to a second row selection line (vertical scanning line) Pres1 shown in FIG. 4 extending in the horizontal direction. The gates of the reset MOS field-effect transistors 23 in the other pixels located in the same row are also connected to the second row selection line Pres1. The gate of the selection MOS field-effect transistor 25 is connected to a third row selection line (vertical scanning line) Psel1 extending in the horizontal direction. The gates of the selection MOS field-effect transistors 25 in the other pixels in the same row are also connected to the third row selection line Psel1. The first to third row-selection lines Ptx1, Pres1, and Psel1 are connected to the vertical shift register 31 and signal voltages are supplied to the first to third row selection lines Ptx1, Pres1, and Psel1.

In the other rows shown in FIG. 4, pixels having similar configurations and row selection lines, such as row selection lines Ptx2 to Ptx3, row selection lines Pres2 to Pres3, and row selection lines Psel2 to Psel3, generated by the vertical shift register 31 are provided.

The source of the selection MOS field-effect transistor 25 is connected to a terminal Vout of a vertical signal line extending in a vertical direction. The sources of the selection MOS field-effect transistors 25 in the pixels located in the same column are also connected to the terminal Vout of the vertical signal line. Referring to FIG. 4, the terminal Vout of the vertical signal line is connected to a corresponding constant-current source 37, which serves as a load.

A shooting operation using the mechanical shutter 2 in the image pickup apparatus having the above-described configuration will now be described.

Prior to a shooting operation, a necessary program, necessary control data, necessary correction data of a defective pixel, and the like are transferred from the ROM 15 and stored in the RAM 16. The program and the data are used when the system controller 14 controls the image pickup apparatus. In addition, according to need, additional program and data are transferred from the ROM 15 to the RAM 16, and the system controller 14 directly reads the data stored in the ROM 15 and uses the read data.

The optical system 1 drives the aperture and the lens through the driving circuit 7 in accordance with a control signal from the system controller 14, and an object image set to have an appropriate brightness is formed on the image pickup element 3.

Then, the mechanical shutter 2 is driven through the driving circuit 7 in accordance with a control signal from the system controller 14 such that shading of the image pickup element 3 is performed in accordance with an operation of the image pickup element 3 to achieve a necessary exposure time. In the case that the image pickup element 3 has an electronic shutter function, a necessary exposure time may be ensured using the electronic shutter function together with the mechanical shutter 2.

The image pickup element 3 is driven in accordance with a driving pulse based on an operation pulse generated by the timing-signal generation circuit 6. The image pickup element 3 performs photoelectric conversion of the object image to obtain an electric signal and outputs the obtained electric signal as an analog image signal. Clock synchronous noise of the analog image signal output from the image pickup element 3 is removed by the CDS circuit 4 in accordance with the operation pulse generated by the timing-signal generation circuit 6 controlled by the system controller 14, and the analog image signal from which the clock synchronous noise has been removed is converted into a digital image signal by the A/D converter 5.

Then, the digital image is stored in the image memory 9. The signal processing circuit 8 performs image processing, such as color conversion, white balance control, and gamma correction, resolution conversion, and image compression, on the digital image signal, under the control of the system controller 14.

The signal processing circuit 8 also performs correction of a defective pixel on the basis of correction data, such as an address of a defective pixel stored in the ROM 15. In addition, the signal processing circuit 8 extracts data corresponding to a pixel exhibiting a high output having a continuity with respect to an adjacent pixel from a captured image, and performs correction of a pixel that requires correction, as in the defective pixel.

Correction processing for a defective pixel and correction processing for a pixel exhibiting a high output having a continuity with respect to an adjacent pixel will be described later.

The image memory 9 is used for temporarily storing a digital image signal on which signal processing is being performed and storing image data, which is a digital image signal on which signal processing has been performed. The recording circuit 11 converts image data on which signal processing has been performed by the signal processing circuit 8 and image data stored in the image memory 9 into data suitable for the recording medium 10 (for example, file system data having a hierarchical structure). The obtained data is recorded in the recording medium 10. Alternatively, after the signal processing circuit 8 performs resolution conversion of the obtained data, the display circuit 13 converts the obtained data into a signal suitable for the image display device 12 (for example, an analog signal in the National Television System Committee (NTSC) system) and the obtained signal is displayed on the image display device 12.

However, the signal processing circuit 8 may directly output a digital image signal as image data to the image memory 9 or the recording circuit 11 without performing signal processing in accordance with a control signal from the system controller 14.

In addition, in response to a request from the system controller 14, the signal processing circuit 8 outputs to the system controller 14 information on a digital image signal or image data generated in the signal processing. Information to be output is, for example, information including a spatial frequency of an image, an average value of a designated area, and the data amount of a compressed image, or information including data of a pixel extracted from a captured image as data of a pixel to be corrected. In addition, in response to a request from the system controller 14, the recording circuit 11 outputs to the system controller 14 information including the type of the recording medium 10 and the free area of the recording medium 10.

A playback operation to be performed in a case where image data is recorded in the recording medium 10 will now be described.

In accordance with a control signal from the system controller 14, the recording circuit 11 reads image data from the recording medium 10. In addition, in accordance with a control signal from the system controller 14, in the case that the read image data is a compressed image, the signal processing circuit 8 performs image decompression of the compressed image and stores the obtained image in the image memory 9.

The signal processing circuit 8 performs resolution conversion of the image data stored in the image memory 9. Then, the display circuit 13 converts the obtained image data into a signal suitable for the image display device 12, and the obtained signal is displayed on the image display device 12.

A correction process to be performed for a defective pixel and a pixel that outputs a non-reproducible high-level signal having a continuity with respect to an adjacent pixel will be described with reference to FIGS. 5 and 6.

Referring to FIG. 2, for example, pixels with oblique lines located in positions, R(x+6, y+2), B(x+5,y+3), R(x+4,y+4), B(x+3,y+5), and R(x+2,y+6), output noise signals at a high level having a continuity with respect to an adjacent pixel. In this embodiment, an example in which outputs of the pixels with oblique lines shown in FIG. 2 are corrected will be explained.

Figure 5:
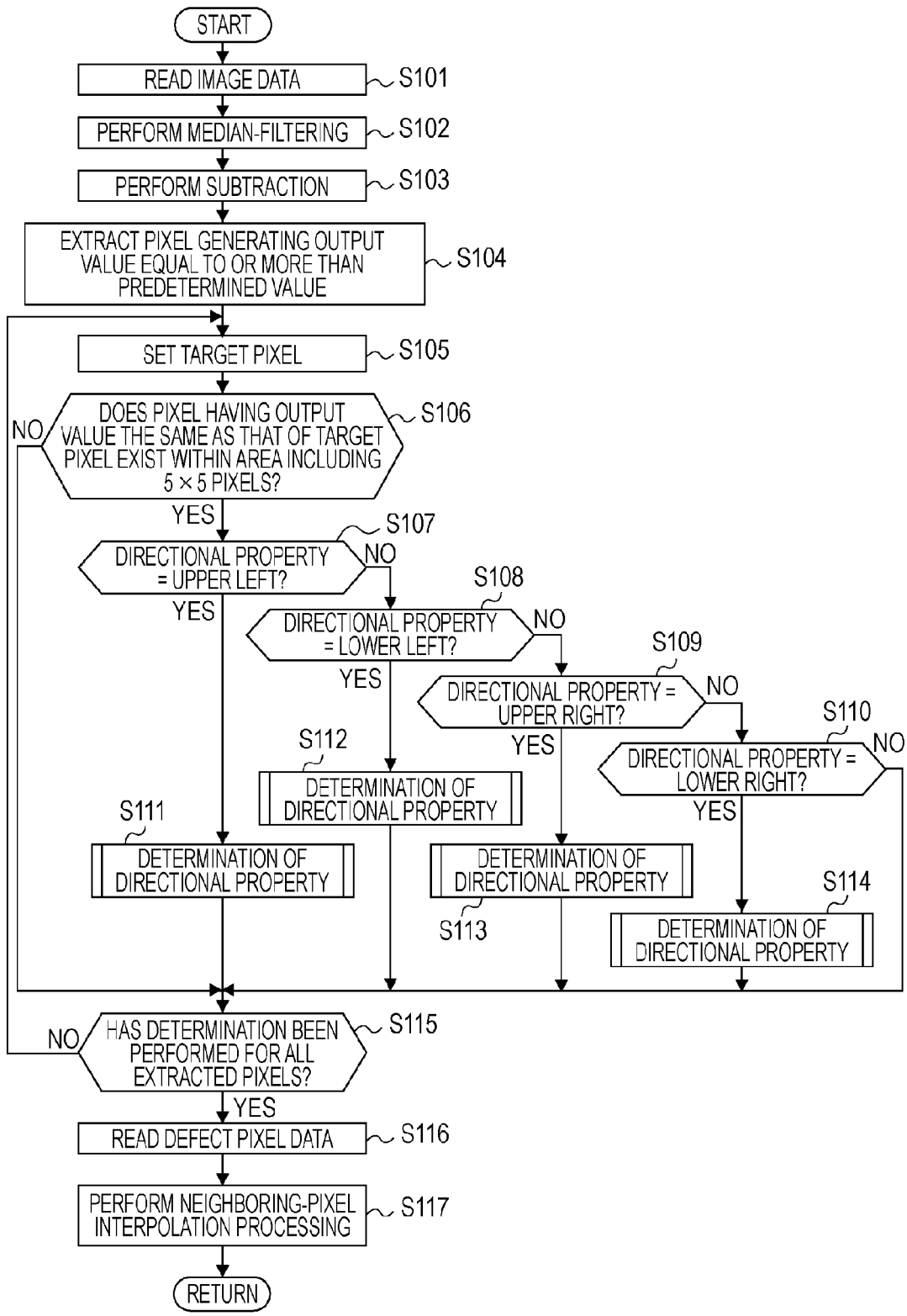
FIG. 5 is a flowchart showing a correction process to be performed for a defective pixel and a pixel that generates a non-reproducible high-level output having a continuity with respect to an adjacent pixel.
Figure 6:
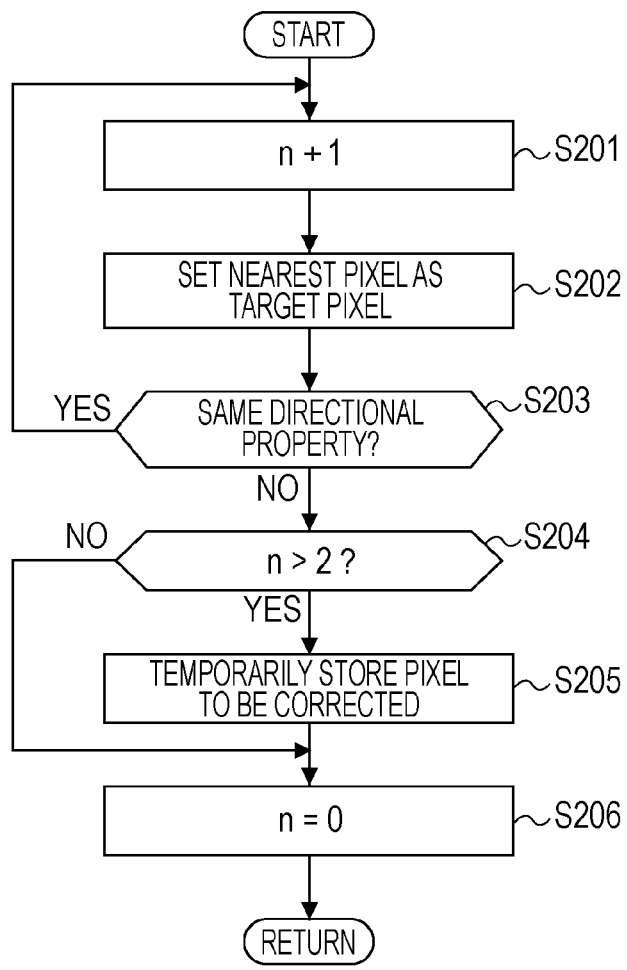
FIG. 6 is a flowchart showing a process of a determination regarding a directional property to be performed in each of steps S111 to S114 of FIG. 5.

Referring to FIG. 5, in step S101, captured image data stored in the image memory 9 is read. In step S102, the signal processing circuit 8 performs median filtering for the read image data.

In the median filtering in step S102, processing for, with respect to a pixel of interest (for example, a pixel R(x+6,y+2)), extracting a median value of image data within an area including five by five pixels in the vertical and horizontal directions having the same color and substituting the extracted median value for the value of the pixel of interest is sequentially performed for all the pixels. In a case where an area including five by five pixels in the vertical and horizontal directions is not obtained since a pixel to be processed is located at a corner of the image pickup element 3, median filtering is performed for the maximum area centered on a pixel of interest (for example, an area including three by three pixels in the vertical and horizontal directions).

In addition, in the case that it is determined in accordance with position information obtained from defective pixel data stored in the ROM 15 that a defective pixel exists in an area for which median filtering is to be performed, the defective pixel is excluded from a pixel for which calculation is to be performed, and median filtering is performed by using pixel data other than data of the defective pixel.

For example, referring to FIG. 2, in the case of a pixel of interest R(x+6,y+2), a median value of color R received within an area including five by five pixels in the vertical and horizontal directions, that is, pixels from an upper left pixel R(x+4,y) to a lower right pixel R(x+8,y+4) is calculated. If data corresponding to a pixel R(x+8,y) is extracted indicating the pixel as a defective pixel, median filtering is performed using pixel data other than data of the pixel R(x+8,y).

Similarly, for pixels receiving each of colors G and B, median filtering is performed for an area including five by five pixels in the vertical and horizontal directions having the same color.

In step S103, processing for subtracting image data obtained by the median filtering in step S102 from the original image data is performed. Then, the obtained output level, position information, and the like are transferred to and temporarily stored in the RAM 16.

Image data obtained by the median filtering in step S102 is smoothed image data not including a high-frequency component and not affected by a defective pixel. Thus, since the smoothed image data is subtracted from the original image data, an outstanding output value which represents a noise component can be obtained in step S103.

In step S104, data corresponding to a pixel that generates an output value that is equal to or more than a predetermined value is extracted (with an extraction unit) from among the outstanding output values obtained in step S103. As the predetermined value used here for the determination of whether to extract an output value, a certain level of a pixel in an image that is problematic compared with other pixels is set.

In step S105, from among the data corresponding to pixels extracted in step S104, a target pixel to be subjected to a determination of whether the pixel has a directional property in terms of continuity is set. That is, referring to FIG. 2, processing of step S106 is sequentially performed for pixels generating output values that are equal to or more than the predetermined value, as target pixels, in the order of R(x,y), G(x+1,y), . . . , R(x+10,y), G(x,y+1), B(x+1,y+1), . . . , and so on.

In step S106, it is determined whether, from among the target pixels set in step S105, a target pixel that generates an output value the same as that of an adjacent pixel exists within an area including five by five pixels in the vertical and horizontal directions. This determination is performed irrespective of the color the pixel receives. In the case that a target pixel is an R-pixel, each of the adjacent G and B pixels are also subjected to a determination of whether the pixel generates an output value the same as that of the R-pixel.

If a pixel that outputs a signal having the same level as that of the target pixel is found in step S106, the directional property of the found pixel is determined in steps S107 to S110. For example, it is determined whether the found pixel that outputs a signal having the same level as that of the target pixel is located in any of areas including three by three pixels in the vertical and horizontal directions in four directions, on the upper left hand side, the lower left hand side, the upper right hand side, or the lower right hand side, regarding the target pixel as being a vertex.

Even noise generated due to cosmic rays is an output of a signal at a high level having a continuity with respect to an adjacent pixel, such noise is not affected by a transfer path of a vertical signal line or a horizontal signal line. Thus, such noise is not generated in parallel with the vertical signal line or the horizontal signal line. Thus, in this embodiment, in order to detect that noise is generated due to cosmic rays, with respect to the target pixel, it is determined whether a signal at a high level is generated within any of areas including pixels, in the four directions, not located in parallel with the vertical signal line or the horizontal signal line. For example, in the case that a pixel R(x+6,y+2) is a target pixel, it is also determined whether each of a pixel B(x+7,y+1) and a pixel R(x+4,y+4), which are located obliquely relative to the target pixel R(x+6,y+2), outputs a signal having a level the same as that of the target pixel R(x+6,y+2).

More specifically, referring to FIG. 2, in the case that the data corresponding to pixel R(x+6,y+2) is extracted and the pixel is indicated as a target pixel that has an output value equal to or more than the predetermined value and that each of a pixel B(x+5,y+3) and a pixel (x+4, y+4) has an output value the same as that of the target pixel R(x+6,y+2), the determination regarding a directional property is performed as described below.

A determination regarding the upper left direction with respect to the target pixel R(x+6,y+2) is performed for an area including three by three pixels in the vertical and horizontal directions from an upper left pixel R(x+4,y) to a lower right pixel R(x+6,y+2). In addition, a determination regarding the lower left direction with respect to the target pixel R(x+6,y+2) is performed for an area including three by three pixels in the vertical and horizontal directions from an upper left pixel R(x+4,y+2) to a lower right pixel R(x+6,y+4).

A determination regarding the upper right direction with respect to the target pixel R(x+6,y+2) is performed for an area including three by three pixels in the vertical and horizontal directions from an upper left pixel R(x+6,y) to a lower right pixel R(x+8,y+2). In addition, a determination regarding the lower right direction with respect to the target pixel R(x+6, y+2) is performed for an area including three by three pixels in the vertical and horizontal directions from an upper left pixel R(x+6,y+2) to a lower right pixel R(x+8,y+4). In the example shown in FIG. 2, since a pixel that has an output value the same as that of the target pixel R(x+6,y+2) is located in the lower left direction (that is, in the area including three by three pixels in the vertical and horizontal directions from the upper left pixel R(x+4,y+2) to the lower right pixel R(x+6,y+4)), it is determined that the directional property of the pixel is "lower left".

In the case that a defective pixel exists within an area for which a determination regarding a direction property is performed, the determination regarding the directional property may be performed for a wider area. Thus, even if the defective pixel has a high output having a continuity and the continuous property in an image is lost, increasing the determination area allows the determination regarding the directional property to be performed accurately.

In steps S111 to S114, with respect to each of the four directions, the number of continuous pixels in the corresponding direction is determined. In this embodiment, data corresponding to three or more continuous pixels are temporarily stored in the RAM 16, the data indicating the continuously adjacent pixels are targets to be corrected. The processing of steps S111 to S114 will be described later.

In step S115, it is determined whether the determination regarding the directional property in terms of continuity has been performed for all the data corresponding to pixels extracted in step S104. If it is determined in step S115 that the determination regarding the directional property in terms of continuity has been performed for all the extracted data corresponding to pixels, the process proceeds to step S116. If it is determined in step S115 that the determination regarding the directional property in terms of continuity has not been performed for all the extracted data corresponding to pixels, the process returns to step S105 to set a pixel for which the determination has not been performed as a target pixel and to perform the determination regarding the directional property in terms of continuity for the target pixel, as described above. That is, in the example shown in FIG. 2, finally, position information on five continuous pixels from the pixel R(x+6, y+2) to the pixel R(x+2,y+6) is temporarily stored in the RAM 16, which serves as a storage medium. Data corresponding to the pixels R(x+6,y+2) to R(x+2,y+6) that indicates the pixels are targets to be corrected is stored in the RAM 16.

In step S116, defective pixel data stored in the RAM 16 is read. In step S117, on the basis of the defective pixel data temporarily stored in the RAM 16 and read in step S116, correction processing for the defective pixel and correction processing for the pixels indicated as targets to be corrected in the processing of steps S111 to S114 are performed for an image. In step S117, interpolation processing is performed, using neighboring pixels having normal output data, for the data of the defective pixel and the data of the target pixels in steps S111 to S114. Substitution of an average of output values of pixels having the same color within an area including five by five pixels, substitution of an intermediate value using a median filter, or the like may be adopted for the interpolation processing.

In this embodiment, a CMOS area sensor of an RGB Bayer pattern is used as the image pickup element 3.

Thus, interpolation processing is performed using average data of, from among pixels located in the nearest neighboring upper, lower, left, right, and diagonal pixels having the same Bayer color as that of the defective pixel, pixels outputting normal data, which are not a defective pixel or a pixel having a high output with a continuity with respect to an adjacent pixel within a captured image. However, the interpolation processing is not necessarily performed as described above. Well-known interpolation processing using desired neighboring pixels can be performed.

In addition, since the correction processing is performed for a pixel having an output value higher than that of a normal pixel in this embodiment, performing the correction processing at the time when a particular shooting mode, such as a night mode or an astronomical mode, selected using a shooting mode setting button (not shown) of the image pickup apparatus achieves effective correction.

A process to determine the directional property in each of steps S111 to S114 of FIG. 5 will now be described with reference to FIG. 6. Since the processing operations of steps S111 to S114 are the same and the correction process show in FIG. 5 proceeds to step S111 when the determination in step S107 is YES in the example shown in FIG. 2, only processing of step S111 will be explained.

In step S201, a counter that counts, with respect to the pixels processed in step S107, the number of pixels continuously adjacent to one another in the same direction is incremented by 1.

In step S202, a pixel that has an output value the same as that of the target pixel and that is located nearest to the target pixel is set as a new target pixel. In step S203, the processing performed in step S107 is performed for an area in the same direction as the detected pixel. If it is determined in step S203 that an adjacent pixel having an output value the same as that of the new target pixel exists in the area in the same direction, the process returns to step S201. Then, another new target pixel is set, and the processing of steps S201 to S203 is repeated until such a pixel does not exist in the same direction any more.

In step S204, it is determined whether the counter that counts the number of pixels continuously adjacent to one another in the same direction exceeds 2. If it is determined in step S204 that the number of pixels continuously adjacent to one another in the same direction does not exceed 2, it is determined that continuously adjacent pixels are not detected and the process proceeds to step S206 to reset the counter to 0. Then, the process returns to step S201. If it is determined in step S204 that the counter value exceeds 2, it is determined in step S205 that the pixels are to be corrected and data corresponding to the detected pixels are temporarily stored in the RAM 16. In the case of determining the continuity in the direction of pixels, since position information on a defective pixel is stored in advance in the ROM 15, the pixel located in the position of the defective pixel may be excluded from targets to be subjected to the continuity determination. Pixels continuously adjacent to one another in the same direction are not necessarily aligned in a line. Pixels continuously adjacent to one another in the same direction may be continuously adjacent pixels within an area including pixels in any of the four directions for which the determinations in steps S107 to S110 are performed on the basis of the target pixel.

As described above, in this embodiment, in the case that a predetermined number or more of pixels outputting signals having a level equal to or more than a predetermined value are continuously adjacent to one another in the same direction in a predetermined area of a captured image, irrespective of the color received by the pixel, data corresponding to the continuously adjacent pixels that indicates the continuously adjacent pixels are target pixels to be corrected and correction processing is performed for the target pixels as well as a defective pixel. Thus, a pixel outputting a non-reproducible signal of a sudden noise having a continuity with respect to an adjacent pixel can also be corrected. Consequently, an excellent captured image can be obtained.

The present invention is not limited to any of the above-described embodiments. Modifications can be made to the present invention without departing from the spirit of the present invention.

An aspect of the present invention can be attained by performing processing for supplying a storage medium in which program code of software implementing functions of the above-described embodiments is stored to a system or an apparatus and reading, with a computer (or a CPU or an microprocessing unit (MPU)) of the system or the apparatus, the program code stored in the storage medium.

In this case, the program code itself read from the storage medium implements the functions of the above-described embodiments. That is, the program code itself and the storage medium in which the program code is stored fall within the scope of the present invention.

As a storage medium for supplying the program code, for example, a floppy disk, a hard disk, a magneto-optical disk, a compact disc read-only memory (CD-ROM), a compact disc recordable (CD-R), a compact disc rewritable (CD-RW), a digital versatile disc read-only memory (DVD-ROM), a digital versatile disc random-access memory (DVD-RAM), a DVD-RW, a DVD+RW, a magnetic tape, a non-volatile memory card, or a ROM can be used. Alternatively, the program code may be downloaded via a network.

In addition, a case where the functions of the above-described embodiments are attained when the computer performs the read program code also falls within the scope of the present invention. In addition, a case where the functions of the above-described embodiments are attained when part or all of the actual processing is performed by an operating system (OS) or the like running on the computer on the basis of instructions of the program code also falls within the scope of the present invention.

In addition, a case where the functions of the above-described embodiments are attained by the processing described below also falls within the scope of the present invention. That is, a case where the functions of the above-described embodiments are attained when the program code read from the storage medium is written to a memory arranged in a function expansion board inserted into the computer or a function expansion unit connected to the computer and then the CPU or the like arranged in the function expansion board or the function expansion unit performs part or all of the actual processing on the basis of instructions of the program code also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Application No. 2007-163996 filed Jun. 21, 2007, which is hereby incorporated by reference herein in its entirety.

What is claimed is:

1. An image pickup apparatus comprising:
an image pickup element configured to obtain an image of an object, the image of the object including a plurality of pixels;
an extraction unit configured to extract, from the image pickup element, pixels that have an output value that is equal to or more than a predetermined value, wherein a median value is obtained by performing median filtering with respect to each pixel of the image of the object and the output value for each pixel is obtained by subtracting the median value from each pixel of the image of the object;
a setting unit configured to set a pixel among the extracted pixels as a target pixel;
a determination unit configured to determine whether a condition that a predetermined number or more of the extracted pixels that have the same output value as that of the target pixel, irrespective of a color received by the target pixel, are continuously adjacent to one another in a same direction is satisfied;
a storage unit configured to store, in a case that the determination unit determines that the condition is satisfied, data that indicates the continuously adjacent pixels are target pixels to be corrected and further configured not to store, in a case that the determination unit determines that the condition is not satisfied, the data that indicates the continuously adjacent pixels are the target pixels to be corrected; and
a correction unit configured to correct signals output from the target pixels.

2. The image pickup apparatus according to claim 1, wherein the determination unit determines, with respect to a plurality of directions centered on the target pixel of the extracted pixels, whether the condition that the predetermined number or more of the extracted pixels that have the same output value as that of the target pixel, irrespective of a color received by the target pixel, are continuously adjacent to one another in the same direction is satisfied.

3. The image pickup apparatus according to claim 1, wherein the image pickup element outputs a signal from each of the plurality of pixels through a vertical transfer path and a horizontal transfer path, and
wherein the determination unit determines, with respect to directions including a direction that is not in parallel with the vertical transfer path or the horizontal transfer path, whether the condition that the predetermined number or more of the extracted pixels that have the same output value as that of the target pixel, irrespective of a color received by the target pixel, are continuously adjacent to one another is satisfied.

4. The image pickup apparatus according to claim 1, wherein the determination unit performs the determination for the extracted pixels that are different from a defective pixel whose data is stored in advance in a storage medium.

5. The image pickup apparatus according to claim 1, wherein the correction unit performs correction only when a particular shooting mode is set.

6. A method for correcting outputs of an image pickup element obtaining an image of an object including a plurality of pixels, the method comprising:
extracting, from the image pickup element, pixels that have an output value that is equal to or more than a predetermined value, wherein extracting pixels comprises:
generating a median value by performing median filtering with respect to each pixel of the image of the object; and
subtracting the median value from each pixel of the image of the object to obtain the output value for each pixel;
setting a pixel among the extracted pixels as a target pixel;
determining whether a condition that a predetermined number or more of the extracted pixels that have the same output value as that of the target pixel, irrespective of a color received by the target pixel, are continuously adjacent to one another in a same direction is satisfied;
storing, in a case that the condition is determined to be satisfied, data that indicates the continuously adjacent pixels are target pixels to be corrected;
not storing, in a case that the condition is determined not to be satisfied, the data that indicates the continuously adjacent pixels are target pixels to be corrected; and
correcting signals output from the target pixels.

7. The method according to claim 6, wherein, in the determining, it is determined, with respect to a plurality of directions centered on the target pixel of the extracted pixels, whether the condition that the predetermined number or more of the extracted pixels that have the same output value as that of the target pixel, irrespective of a color received by the target pixel, are continuously adjacent to one another in the same direction is satisfied.

8. The method according to claim 6,
wherein the image pickup element outputs a signal from each of the plurality of pixels through a vertical transfer path and a horizontal transfer path, and
wherein in the determining, it is determined, with respect to directions including a direction that is not in parallel with the vertical transfer path or the horizontal transfer path, whether the condition that the predetermined number or more of the extracted pixels that have the same output value as that of the target pixel, irrespective of a color received by the target pixel, are continuously adjacent to one another is satisfied.

9. The image pickup apparatus according to claim 1, further comprising a filtering unit configured to obtain the median value with respect to each pixel of the image within a pixel area.

10. The image pickup apparatus according to claim 9, wherein the pixel area is a 5×5 area.

11. The image pickup apparatus according to claim 9, wherein the pixel area is a variable pixel area, variation being based on a number of defective pixels found in the pixel area.

12. The method according to claim 6, wherein the median value with respect to each pixel of the image is obtained within a pixel area via a filtering unit.

13. The method according to claim 12, further comprising defining the pixel area as a 5×5 area.

14. The method according to claim 12, further comprising defining the pixel area as a variable pixel area, variation being based on a number of defective pixels found in the pixel area.

\* \* \* \* \*